US012721252B2

(12) United States Patent
Corpstein et al.

(10) Patent No.: US 12,721,252 B2
(45) Date of Patent: Sep. 1, 2026

(54) TILLAGE IMPLEMENTS, SYSTEMS, AND METHODS FOR WORKING A FIELD

(71) Applicant: AGCO Corporation, Hesston, KS (US)

(72) Inventors: Keith Robert Corpstein, Beloit, KS (US); Jarret Lee Brinker, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 1760 days.

(21) Appl. No.: 16/943,753

(22) Filed: Jul. 30, 2020

(65) Prior Publication Data

US 2021/0045284 A1 Feb. 18, 2021

Related U.S. Application Data

(60) Provisional application No. 62/885,376, filed on Aug. 12, 2019.

(51) Int. Cl.

| | |
|---|---|
| ***A01B 79/00*** | (2006.01) |
| ***A01B 35/08*** | (2006.01) |
| ***A01B 63/00*** | (2006.01) |
| ***A01B 63/32*** | (2006.01) |
| ***G01C 9/00*** | (2006.01) |
| ***G01P 15/00*** | (2006.01) |
| ***H04Q 9/00*** | (2006.01) |

(52) U.S. Cl.
CPC ............ *A01B 79/005* (2013.01); *A01B 35/08* (2013.01); *A01B 63/008* (2013.01); *H04Q 9/00* (2013.01); *A01B 63/32* (2013.01); *G01C 9/00* (2013.01); *G01P 15/00* (2013.01)

(58) Field of Classification Search
CPC ..... A01B 79/005; A01B 35/08; A01B 63/008; A01B 63/32; G01C 9/00; G01P 15/00; H04Q 9/00
See application file for complete search history.

(56) References Cited

U.S. PATENT DOCUMENTS 5,044,756 A * 9/1991 Gaultney et al. .. G01N 21/8507 356/402
6,070,673 A * 6/2000 Wendte ................. G01C 21/20 701/50

(Continued)

FOREIGN PATENT DOCUMENTS

CN 105987679 B 9/2018
CN 209043363 U 6/2019

(Continued)

OTHER PUBLICATIONS

UK Intellectual Property Office, Search Report for related UK Application No. GB1912710.9, dated Feb. 27, 2020.

*Primary Examiner* — Tara Mayo

(57) ABSTRACT

A tillage implement includes a frame, a first sensor coupled to the frame and configured to measure an orientation of the frame, a shank engaged with the frame and carrying a tilling tool, and a second sensor coupled to the shank or the tilling tool and configured to measure an orientation of the tilling tool. A system for working a field includes a tillage implement and a tractor drawing the tillage implement. The tractor may include a computer configured to receive information from the first sensor and the second sensor and control an operating parameter of the tillage implement. Related methods and computer-readable media are also disclosed.

17 Claims, 5 Drawing Sheets

(56) References Cited

U.S. PATENT DOCUMENTS

| | | | | |
|---|---|---|---|---|
| 8,078,367 | B2 | 12/2011 | Sauder et al. | |
| 10,123,475 | B2 | 11/2018 | Posselius et al. | |
| 10,251,323 | B2 | 4/2019 | Knobloch et al. | |
| 10,251,328 | B2 | 4/2019 | Gerber et al. | |
| 2009/0187315 | A1* | 7/2009 | Yegerlehner et al. | A01B 13/08 701/50 |
| 2013/0180742 | A1* | 7/2013 | Wendte et al. | A01B 63/1145 172/4 |
| 2015/0156950 | A1* | 6/2015 | Henry | A01B 51/04 172/664 |
| 2016/0165789 | A1* | 6/2016 | Gervais et al. | A01C 7/205 700/275 |
| 2018/0103574 | A1 | 4/2018 | Knobloch et al. | |
| 2018/0116095 | A1 | 5/2018 | Knobloch et al. | |
| 2018/0153088 | A1* | 6/2018 | Sporrer et al. | A01B 63/32 |
| 2019/0045700 | A1 | 2/2019 | Knobloch | |
| 2019/0208698 | A1* | 7/2019 | Maxton et al. | A01C 7/203 |
| 2019/0246548 | A1 | 8/2019 | Kovach et al. | |
| 2020/0221628 | A1* | 7/2020 | Blunier et al. | A01B 63/14 |
| 2020/0249217 | A1* | 8/2020 | Stanhope et al. | G01N 21/25 |
| 2020/0260633 | A1* | 8/2020 | Kovach et al. | A01B 71/02 |
| 2020/0404831 | A1* | 12/2020 | Kowalchuk et al. | A01C 21/00 |

FOREIGN PATENT DOCUMENTS

| | | | |
|---|---|---|---|
| EP | 0776598 | A1 | 6/1997 |
| WO | 2017/158006 | A2 | 9/2017 |

* cited by examiner

TILLAGE IMPLEMENTS, SYSTEMS, AND METHODS FOR WORKING A FIELD

CROSS-REFERENCE TO RELATED APPLICATION

This application claims the benefit of the filing date of U. S. Provisional Patent Application 62/885,376, "Tillage Implements, Systems, and Methods for Working a Field," filed Aug. 12, 2019, the entire disclosure of which is incorporated herein by reference.

FIELD

Embodiments of the present disclosure relate to working agricultural fields. More particularly, embodiments of the present disclosure relate to methods for measuring and improving performance of tillage implements.

BACKGROUND

Crop yields are affected by a variety of factors, such as seed placement, soil quality, weather, irrigation, and nutrient applications. Soil quality and the ability to accurately place seeds at a selected depth may be affected by the smoothness of the surface of the soil and the smoothness of the seed bed (i.e., the interface between soil worked by a cultivator and a more compacted soil underneath). Both measures of smoothness are affected by the consistency of cultivator depth. The smoothness of the seed bed is affected by the operation of tilling tools used to till the soil. In particular, increasing the consistency of the depth of the tilling tools increases the smoothness of the seed bed. The smoothness of the seed bed cannot be visually detected because it lies underneath a layer of the worked soil.

BRIEF SUMMARY

In some embodiments, a tillage implement includes a frame, a first sensor coupled to the frame and configured to measure an orientation of the frame, a shank engaged with the frame and carrying a tilling tool, and a second sensor coupled to the shank or the tilling tool and configured to measure an orientation of the tilling tool.

A system for working a field includes a tillage implement and a tractor drawing the tillage implement. The tillage implement may include a frame, a first sensor coupled to the frame and configured to measure an orientation of the frame, a shank engaged with the frame and carrying a tilling tool, and a second sensor coupled to the shank or the tilling tool and configured to measure an orientation of the tilling tool. The tractor may include a computer configured to receive information from the first sensor and the second sensor and control an operating parameter of the tillage implement.

Some methods of working a field include dragging a shank of a tillage implement through soil, generating a first signal with a first sensor, generating a second signal with a second sensor, and determining a location of a tilling tool relative to the frame based on the first signal and the second signal. The shank carries the tilling tool and is coupled to a frame. The first signal corresponds to an orientation of the frame, and the second signal corresponds to an orientation of the tilling tool.

A non-transitory computer-readable storage medium may include instructions that when executed by a computer, cause the computer to cause a tractor to drag a shank of a tillage implement through soil, generate a first signal with a first sensor, generate a second signal with a second sensor, and determine a location of a tilling tool relative to the frame based on the first signal and the second signal. The shank carries the tilling tool and is coupled to a frame. The first signal corresponds to an orientation of the frame, and the second signal corresponds to an orientation of the tilling tool.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
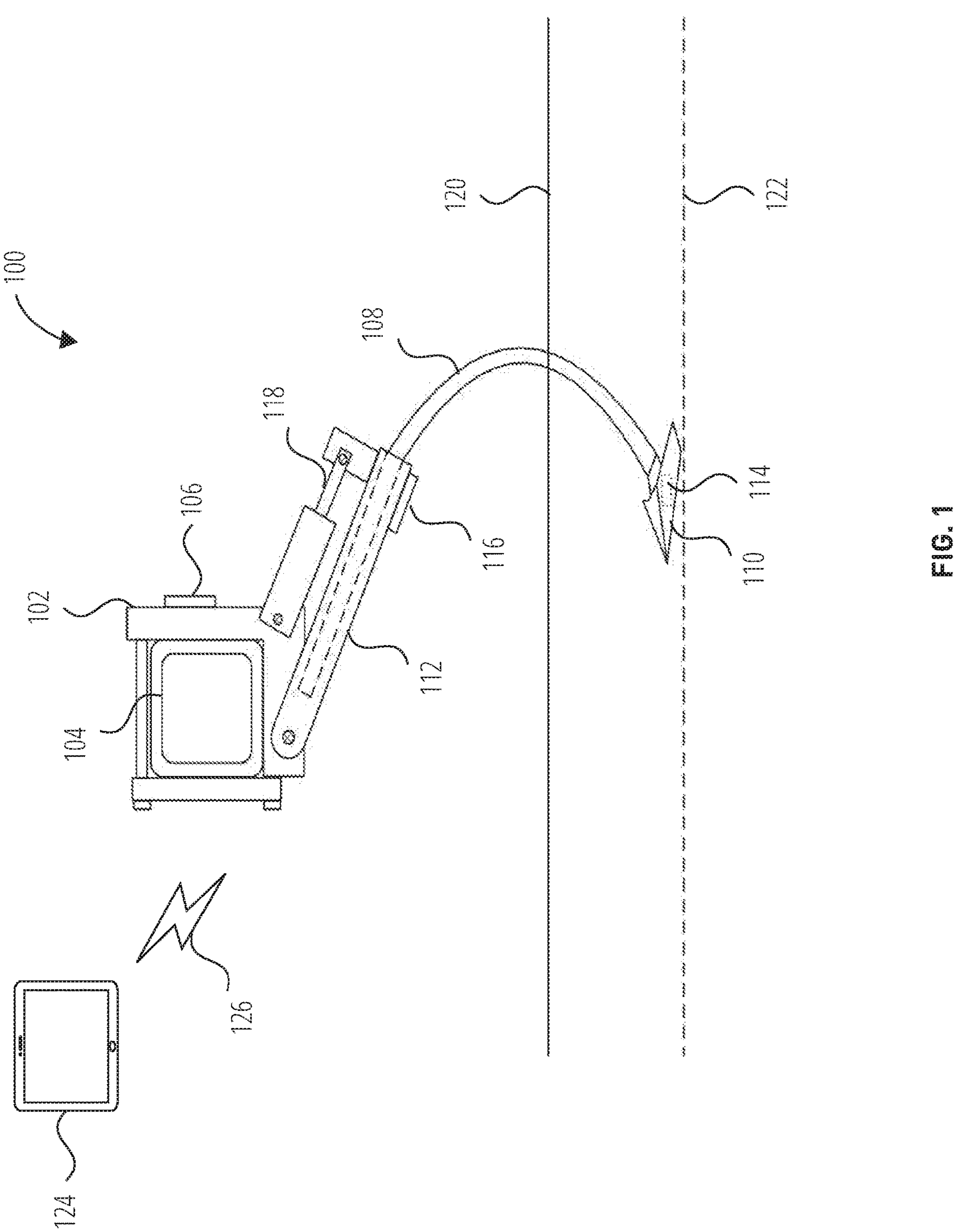
FIG. 1 is a simplified side view of a tillage implement.

The illustrations presented herein are not actual views of any tilling tool or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an embodiment of a tillage implement 100. The tillage implement 100 has a frame 102 that is carried by a draw bar 104, which may typically be pulled by a tractor through an agricultural field. A first sensor 106 is coupled to the frame 102 and configured to measure an orientation of the frame 102. The first sensor 106 may include an accelerometer, an inclinometer, a gyroscope, a combination of one or more of these sensors, or any other sensor that is capable of measuring orientation.

A shank 108 is attached to the frame 102 and carries a tilling tool 110. In some embodiments, the shank 108 may be engaged with the frame 102 by a coupling arm 112 configured to pivot with respect to the frame 102. In other embodiments, the shank 108 may be secured directly to the frame 102. As shown, the coupling arm 112 may be connected to the frame 102 at a pivot connection, and a biasing member 118 may also connect the coupling arm 112 to the frame 102. The biasing member 118 may include, for example, a spring, a pneumatic actuator, an electrical actuator, a hydraulic actuator, etc. The biasing member 118 may be adjustable to control a depth of the tilling tool 110 within the soil.

A second sensor 114 may be coupled to the tilling tool 110 and configured to measure an orientation of the tilling tool 110. The second sensor 114 may be of the same type or a different type than the first sensor 106 coupled to the frame 102. Thus, the second sensor 114 may include an accelerometer, an inclinometer, a gyroscope, a combination of one or more of these sensors, or any other sensor that is capable of measuring orientation. In some embodiments, the second sensor 114 may be disposed within a body of the tilling tool 110 to protect the second sensor 114 from damage due to exposure to the soil. For example, the second sensor 114 may be disposed behind a cutting edge of the tilling tool 110.

In some embodiments, the tillage implement 100 may include a third sensor 116 instead of or in addition to the second sensor 114. The third sensor 116, if present, may be coupled to the shank 108 (e.g., via the coupling arm 112), and may be configured to measure the orientation of the shank 108.

The first sensor 106, second sensor 114, and third sensor 116 may each be configured to transmit signals related to the orientation thereof, and therefore to the element carrying the sensors. The signals may be transmitted to a computer 124 by a wired or wireless communications link 126. The computer 124 may typically be located within a tractor cab and include a display through which an operator can control the tillage implement 100. The computer 124 may have a receiver to receive signals and a transmitter to transmit signals (e.g., control signals) to the tillage implement 100. In some embodiments, the computer 124 may include a touch-screen or another user input.

In use, the tilling tool 110 typically rides below a soil surface 120 and cultivates the soil to a depth at which the tilling tool 110 travels, indicated in FIG. 1 as the depth of a seed bed 122. The seed bed 122 line represents a depth at which a planter may deposit seeds or a depth to which roots may grow with relatively little resistance (due to the cultivation of the soil above the seed bed 122 line). The soil below the seed bed 122 may be less available to plants for nutrient storage than soil above the seed bed 122. The uniformity of the depth of the seed bed 122 may be controlled by controlling the height and orientation of the tilling tool 110 traversing the field.

Figure 2:
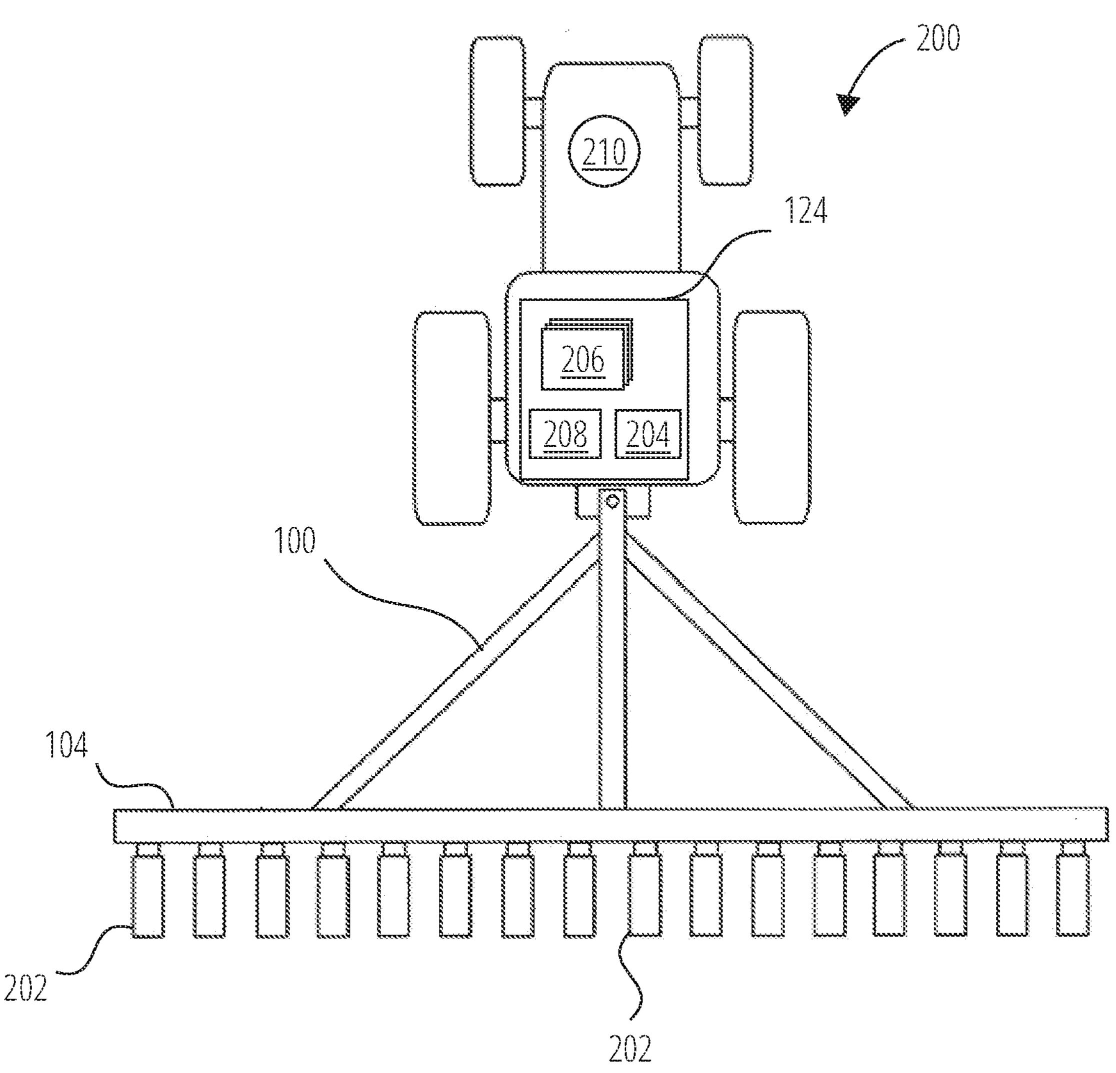
FIG. 2 is a simplified top view of a tractor pulling the tillage implement shown in FIG. 1.

FIG. 2 illustrates a tractor 200 drawing the tillage implement 100 shown in FIG. 1 and described above, which includes the draw bar 104 and multiple tilling assemblies 202. Each of the tilling assemblies 202 may include a frame 102, a shank 108, a tilling tool 110, and sensors 106, 114, and/or 116. In some embodiments, a single frame 102 may couple to multiple shanks 108 and tilling tools 110 (and thus, a single first sensor 106 may operate with multiple tilling tools 110). The computer 124 is shown in the cab of the tractor 200, and may include a central processing unit ("CPU") 204, memory 206, implement controller 208, and a graphical user interface ("GUI") (e.g., a touch-screen interface). A global positioning system ("GPS") receiver 210 may be mounted to the tractor 200 and connected to communicate with the computer 124. The computer 124 may include an implement controller 208 configured to communicate with the tilling assemblies 202 and/or the GPS receiver 210, such as by wired or wireless communication (e.g., the communications link 126 depicted in FIG. 1).

The CPU 204 may use a map stored in the memory 206, to determine an operating parameter of the tillage implement 100 at the location of the tillage implement 100 within the field. The implement controller 208 may control the tillage implement 100 such that the tilling assemblies 202 each work the soil in the field at a selected depth at each location within the field. The CPU 204 may also calculate a frequency of a cultivator sweep (i.e., a frequency at which the tilling tool 110 travels back and forth horizontally, vertically, or both) based on signals from the sensors 106, 114, and/or 116. The frequency of the cultivator sweep directly affects the smoothness of the field. The operating parameter may be adjusted as the tillage implement 100 traverses the field based on the map and the location of the tillage implement 100 within the field.

For example, the depth of the tilling assemblies 202 may be set by the implement controller 208 by adjusting the force of the biasing member 118 on the coupling arm 112 or the length of the biasing member 118. The tilling assemblies 202, the tillage implement 100, and the tractor 200 may have other parameters that may also be adjusted, such as a vehicle speed, wheel load, tool angle, etc.

Figure 3:
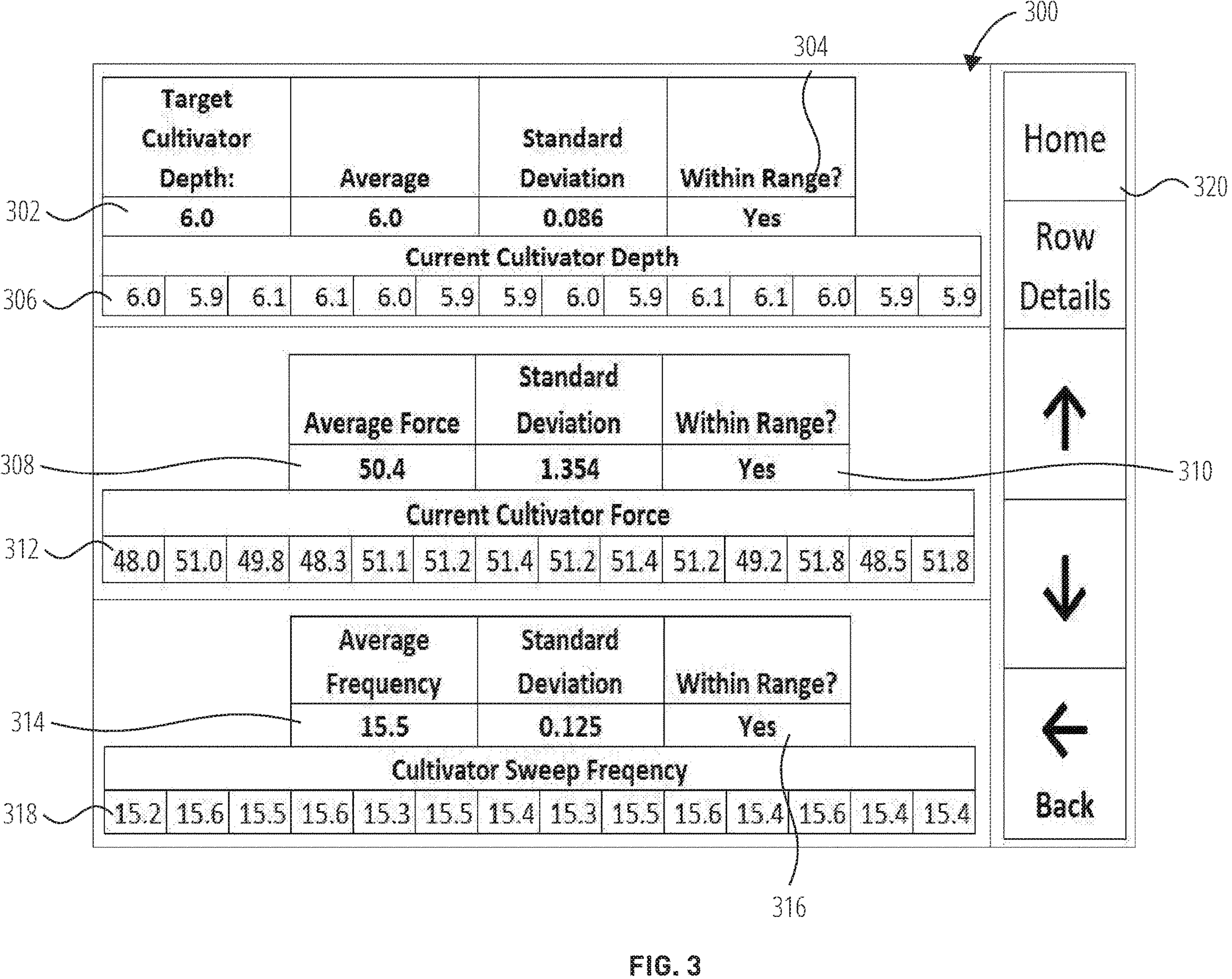
FIG. 3 illustrates a screen of a computer that may be used to operate the tillage implement shown in FIG. 1.

The computer 124 may display a monitoring parameter that the machine operator can use to determine whether an operating parameter should be adjusted. For example, and as shown in FIG. 3, a screen 300 may include information about the status of the tillage implement 100. The computer 124 may be programmed such that the screen 300 shows depth statistics 302 corresponding to, for example, a target cultivator depth, an average depth, and standard deviation. A quality indicator 304 may provide an indication whether the information shown in the depth statistics 302 is within acceptable ranges (which acceptable ranges may be preset by the operator). In some embodiments, the quality indicator 304 may include a color-coded display that changes to alert the operator of changes in the depth statistics 302 (e.g., green, yellow, and red, to indicate good, marginal, and poor statistics, respectively). Depth data points 306 of each tilling tool 110 of the tillage implement 100 may optionally be shown, and each may also be color-coded or otherwise labeled to draw the operator's attention as needed.

The computer 124 may also be programmed such that the screen 300 shows force statistics 308 corresponding to, for example, an average horizontal force on the tilling tool 110 and standard deviation. A quality indicator 310 may provide an indication whether the information shown in the force statistics 308 is within acceptable ranges (which acceptable ranges may be preset by the operator). In some embodiments, the quality indicator 310 may include a color-coded display that changes to alert the operator of changes in the force statistics 308 (e.g., green, yellow, and red, to indicate good, marginal, and poor statistics, respectively). Force data points 312 (i.e., the force on each tilling tool 110 of the tillage implement 100) may optionally be shown, and each may also be color-coded or otherwise labeled to draw the operator's attention as needed.

The computer 124 may be programmed such that the screen 300 shows frequency statistics 314 corresponding to, for example, an average frequency of the cultivator sweeps of the tilling tool 110 and standard deviation. A quality indicator 316 may provide an indication whether the information shown in the frequency statistics 314 is within acceptable ranges (which acceptable ranges may be preset by the operator). In some embodiments, the quality indicator 316 may include a color-coded display that changes to alert the operator of changes in the frequency statistics 314 (e.g., green, yellow, and red, to indicate good, marginal, and poor statistics, respectively). Frequency data points 318 (i.e., the sweep frequency of each tilling tool 110 of the tillage implement 100) may optionally be shown, and each may also be color-coded or otherwise labeled to draw the operator's attention as needed. For example, a single tilling tool 110 with a sweep frequency consistently higher than others may indicate damage to the tilling tool 110, and the operator may elect to interrupt the tilling operation to correct the damage or change an operating parameter to limit the effect on the field.

The screen 300 may also include buttons 320 through which the operator may interact with the computer 124, such as to navigate to other screens, view other information, set operating parameters, etc.

Figure 4:
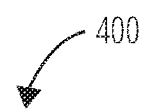
FIG. 4 is a simplified flow chart illustrating an example method of working a field.
Figure 4:
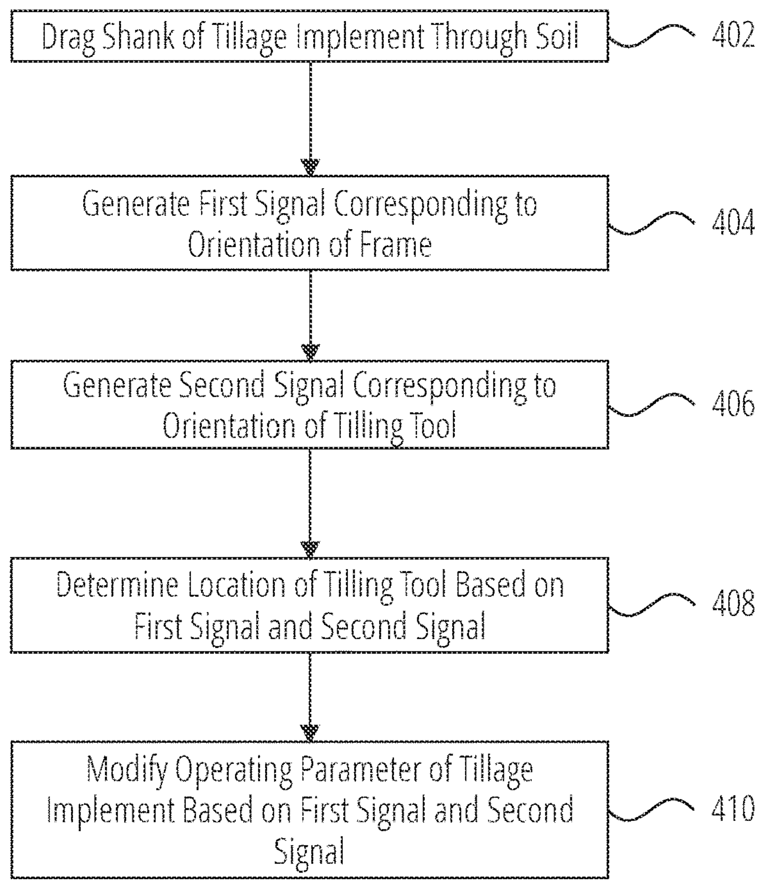

FIG. 4 is a simplified flow chart illustrating a method 400 of working a field, such as using the tillage implement 100 shown in FIG. 1. As shown in block 402, the method 400 includes dragging a shank of a tillage implement through soil. The shank carries a tilling tool and is coupled to a frame, as described above.

In block 404, a first sensor generates a first signal corresponding to an orientation of the frame. In block 406, a second sensor generates a second signal corresponding to an orientation of the tilling tool. The signals may be generated by accelerometers, inclinometers, gyroscopes, or any other sensors or combination of sensors capable of measuring orientation.

In block 408, the method 400 includes determining a location of the tilling tool based on the first signal and the second signal. The frequency of the cultivator sweep (i.e., the change in vertical and horizontal location of the tilling tool over time) may be used to determine the smoothness of the seed bed formed by the tilling tool as the tilling tool travels through the soil.

In block 410, the method 400 may optionally include modifying an operating parameter of the tillage implement based on the first signal and the second signal. Various operating parameters may be adjusted, such as implement depth, vehicle speed, wheel load, tool angle, etc. The modification may be performed by a system operator (e.g., in the cab of a tractor pulling the tillage implement or in a remote location) or by a computer. The modification may be performed to improve the smoothness of the seed bed formed by the tilling tool.

Figure 5:
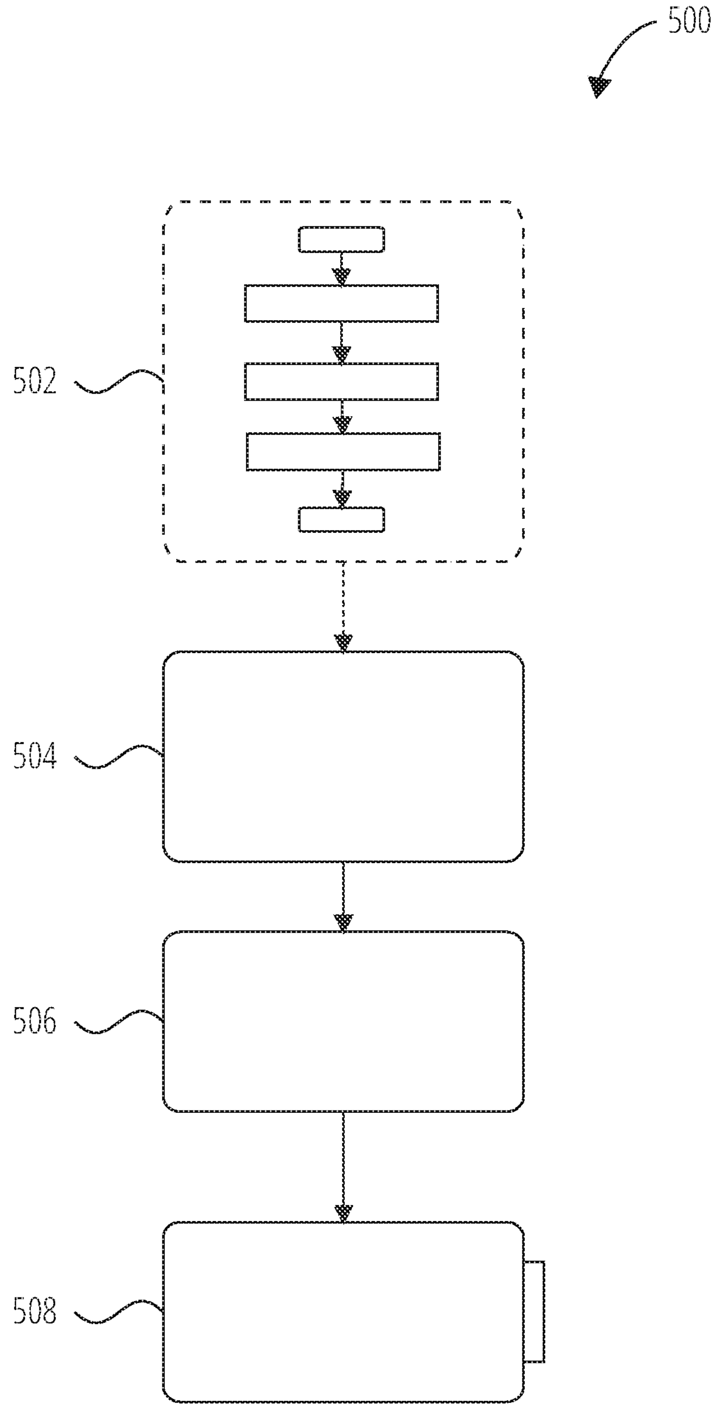
FIG. 5 illustrates an example computer-readable storage medium comprising processor-executable instructions configured to embody one or more of the methods of working a field, such as the method illustrated in FIG. 4.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 5, wherein an implementation 500 includes a computer-readable storage medium 502 (e.g., a flash drive, CD-R, DVD-R, application-specific integrated circuit (ASIC), field-programmable gate array (FPGA), a platter of a hard disk drive, etc.), on which is computer-readable data 504. This computer-readable data 504 in turn includes a set of processor-executable instructions 506 configured to operate according to one or more of the principles set forth herein. In some embodiments, the processor-executable instructions 506 may be configured to cause the computer 124 (FIG. 1) to perform operations 508 when executed via a processing unit, such as at least some of the example method 400 depicted in FIG. 4. In other embodiments, the processor-executable instructions 506 may be configured to implement a system, such as at least some of the example tractor 200 and tillage implement 100 of FIG. 2. Many such computer-readable media may be devised by those of ordinary skill in the art that are configured to operate in accordance with one or more of the techniques presented herein.

The tillage implements, systems, and methods disclosed herein may be used for plowing a field in preparation for planting, or at the end of a growing season, and may be used to provide a smooth field finish.

By measuring tilling depth uniformity and adjusting tilling parameters to improve depth uniformity, the overall yield of the field may be increased because seeds may be planted in the field at a more uniform depth than in fields tilled with conventional implements and methods.

Additional non-limiting example embodiments of the disclosure are described below.

Embodiment 1: A tillage implement comprising a frame, a first sensor coupled to the frame and configured to measure an orientation of the frame, a shank engaged with the frame and carrying a tilling tool, and a second sensor coupled to the shank or the tilling tool and configured to measure an orientation of the tilling tool.

Embodiment 2: The tillage implement of Embodiment 1, wherein at least one of the first sensor and the second sensor comprises an accelerometer.

Embodiment 3: The tillage implement of Embodiment 1 or Embodiment 2, wherein at least one of the first sensor and the second sensor comprises an inclinometer.

Embodiment 4: The tillage implement of any one of Embodiment 1 through Embodiment 3, wherein the first sensor is configured to transmit a first signal related to the orientation of the frame, and wherein the second sensor is configured to transmit a second signal related to the orientation of the tilling tool.

Embodiment 5: The tillage implement of Embodiment 4, further comprising a receiver configured to receive the first and second signals.

Embodiment 6: A system for working a field, comprising a tillage implement and a tractor drawing the tillage implement. The tillage implement comprises a frame, a first sensor coupled to the frame and configured to measure an orientation of the frame, a shank engaged with the frame and carrying a tilling tool, and a second sensor coupled to the shank or the tilling tool and configured to measure an orientation of the tilling tool. The tractor comprises a computer configured to receive information from the first sensor and the second sensor and control an operating parameter of the tillage implement.

Embodiment 7: The system of Embodiment 6, wherein the computer comprises a display configured to communicate a property of the field to a system operator, the property of the field based at least in part on a difference between the orientation of the frame and the orientation of the tilling tool.

Embodiment 8: The system of Embodiment 7, wherein the property of the field comprises a smoothness of an interface between a layer of worked soil and an underlying layer of unworked soil of the field.

Embodiment 9: The system of any one of Embodiment 6 through Embodiment 8, wherein the operating parameter of the tillage implement is selected from the group consisting of an implement speed, a downward force on the tilling tool, and a height of the tilling tool.

Embodiment 10: A method of working a field, the method comprising dragging a shank of a tillage implement through soil, the shank carrying a tilling tool and coupled to a frame. A first signal is generated with a first sensor, the first signal corresponding to an orientation of the frame. A second signal is generated with a second sensor, the second signal corresponding to an orientation of the tilling tool. A location of the tilling tool relative to the frame is determined based on the first signal and the second signal.

Embodiment 11: The method of Embodiment 10, wherein at least one of generating the first signal and generating the second signal comprises generating a signal with an accelerometer.

Embodiment 12: The method of Embodiment 10 or Embodiment 11, wherein at least one of generating the first signal and generating the second signal comprises generating a signal with an inclinometer.

Embodiment 13: The method of any one of Embodiment 10 through Embodiment 12, further comprising modifying an operating parameter of the tillage implement based on the first signal and the second signal.

Embodiment 14: The method of Embodiment 13, wherein modifying an operating parameter of the tillage implement comprises modifying the operating parameter to improve a smoothness of a seed bed formed by the tilling tool.

Embodiment 15: The method of any one of Embodiment 10 through Embodiment 14, wherein determining a location of the tilling tool comprises determining a smoothness of a seed bed formed by the tilling tool.

Embodiment 16: The method of any one of Embodiment 10 through Embodiment 15, further comprising determining a frequency of a cultivator sweep of the tilling tool.

Embodiment 17: A non-transitory computer-readable storage medium, the computer-readable storage medium including instructions that when executed by a computer, cause the computer to cause a tractor to drag a shank of a tillage implement through soil, the shank carrying a tilling tool and coupled to a frame. The computer causes a first signal to be generated with a first sensor, the first signal corresponding to an orientation of the frame. The computer causes a second signal to be generated with a second sensor, the second signal corresponding to an orientation of the tilling tool. The computer determines a location of the tilling tool relative to the frame based on the first signal and the second signal.

Embodiment 18: The non-transitory computer-readable storage medium of Embodiment 17, wherein the processor-executable instructions are further configured to enable the computer processor to adjust an operating parameter of the tillage implement.

Embodiment 19: The non-transitory computer-readable storage medium of Embodiment 18, wherein the processor-executable instructions are configured to enable the computer processor to adjust an operating parameter selected from the group consisting of an implement speed, a downward force on the tilling tool, and a height of the tilling tool.

Embodiment 20: The non-transitory computer-readable storage medium of Embodiment 18 or Embodiment 19, wherein the processor-executable instructions are configured to enable the computer processor to adjust an operating parameter to maintain a selected smoothness of a seed bed formed by the tilling tool.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various implement types and configurations.

What is claimed is:

1. A system for working a field, comprising:

a tillage implement comprising:

a frame;

a first sensor coupled to the frame and configured to measure an orientation of the frame;

a shank engaged with the frame and carrying a tilling tool;

a tractor drawing the tillage implement, the tractor comprising a computer configured to receive information from the first sensor and the second sensor to calculate a frequency of a cultivator sweep, the computer comprising an implement controller configured to control an operating parameter of the tillage implement based on the frequency of the cultivator sweep.

2. The system of claim 1, wherein at least one of the first sensor and the second sensor comprises an accelerometer.

3. The system of claim 1, wherein at least one of the first sensor and the second sensor comprises an inclinometer.

4. The system of claim 1, wherein the first sensor is configured to transmit a first signal related to the orientation of the frame, and wherein the second sensor is configured to transmit a second signal related to the orientation of the tilling tool.

5. The system of claim 1, wherein the computer comprises a display configured to communicate a property of the field to a system operator, the property of the field based at least in part on a difference between the orientation of the frame and the orientation of the tilling tool.

6. The system of claim 5, wherein the property of the field comprises a smoothness of an interface between a layer of worked soil and an underlying layer of unworked soil of the field.

7. The system of claim 1, wherein the operating parameter of the tillage implement is selected from the group consisting of an implement speed, a downward force on the tilling tool, and a height of the tilling tool.

8. The system of claim 1, wherein the second sensor is disposed behind a cutting edge of the tilling tool.

9. The system of claim 1, wherein the tillage implement further comprises a third sensor coupled to the shank and configured to measure an orientation of the shank.

10. A method of working a field, the method comprising:

dragging a shank of a tillage implement through soil, the shank carrying a tilling tool and coupled to a frame;

generating a first signal with a first sensor, the first signal corresponding to an orientation of the frame;

generating a second signal with a second sensor disposed within a body of the tilling tool, the second signal corresponding to an orientation of the tilling tool;

determining a location of the tilling tool relative to the frame based on the first signal and the second signal; and calculating a frequency of a cultivator sweep using the first and second signals; and modifying an operating parameter of the tillage implement based on the frequency of the cultivator sweep.

11. The method of claim 10, wherein at least one of generating the first signal and generating the second signal comprises generating a signal with an accelerometer.

12. The method of claim 10, wherein at least one of generating the first signal and generating the second signal comprises generating a signal with an inclinometer.

13. The method of claim 10, further comprising modifying the operating parameter of the tillage implement based on the first signal and the second signal.

14. The method of claim 13, wherein modifying the operating parameter of the tillage implement comprises modifying the operating parameter to improve a smoothness of a seed bed formed by the tilling tool.

15. The method of claim 10, wherein determining a location of the tilling tool comprises determining a smoothness of a seed bed formed by the tilling tool.

16. The method of claim 10, wherein the second sensor is disposed behind a cutting edge of the tilling tool.

17. The method of claim 10, further comprising generating a third signal with a third sensor coupled to the shank, the third signal corresponding to an orientation of the shank.

* * * * *